G. W. Hagey,
Self Waiting Table,
N° 19,773.  Patented Mar. 30, 1858.
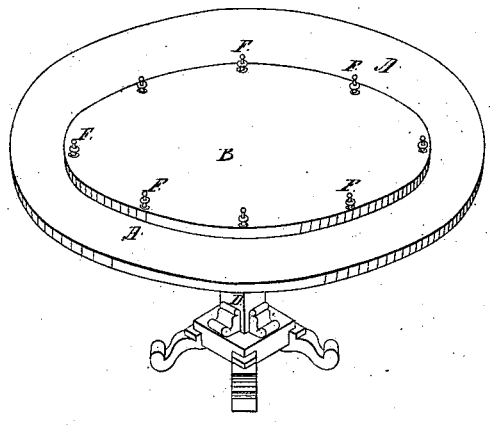
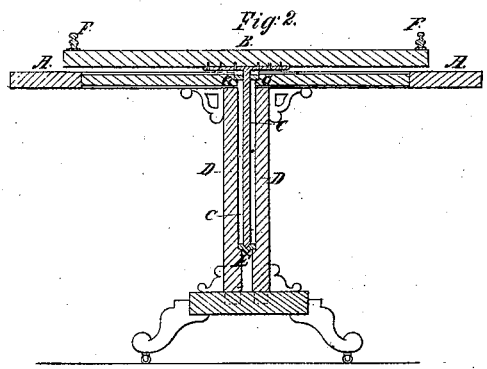
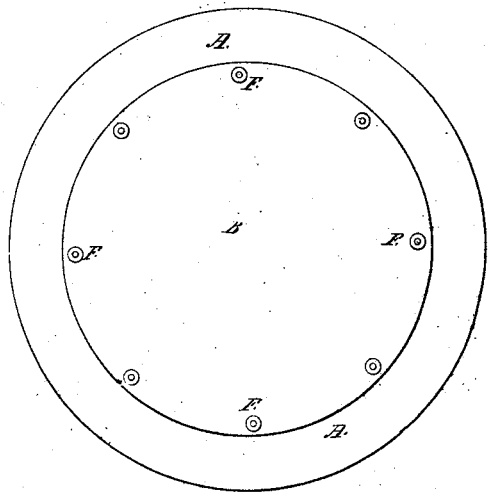

UNITED STATES PATENT OFFICE.

G. W. HAGEY, OF SMITHLAND, KENTUCKY.

SELF-WAITING TABLE.

Specification of Letters Patent No. 19,773, dated March 30, 1858.

*To all whom it may concern:*

Be it known that I, GEORGE W. HAGEY, of Smithland, Livingston county, Kentucky, have invented a new Improvement in Self-Waiting Tables; and I do hereby declare that the following is a full and exact description thereof, reference being had to the accompanying drawings and to the letters of reference marked thereon.

The nature of my invention consists in providing a table of any convenient form or size having a central revolving part B, the part B, being supported by a shaft C, revolving on the central pillar D, resting on the socket E, with handles, F, placed at convenient distances around its circumference.

To enable others skilled in the art to make and use my invention I will proceed to describe its construction and operation.

I construct the table A, of any of the usual materials and of any shape or size required. The central revolving part, B, is made circular in form and as much smaller than the table, A, as will permit the placing of plates, cups, &c., of usual dimensions on table, A, outside of part B. The shaft C, is fastened to part, B, by any of the known methods. The central pillar, D, is made hollow, and provided with a socket, E, to support shaft, C, and a collar, G, to steady shaft, C, while revolving.

In using my invention the dishes, &c., belonging to those sitting at the table will be placed on part, A, while the dishes containing the food will be placed on central part, B. The handles, F, will enable persons to revolve the central part, B, until any article desired is within their reach.

What I claim as my invention and desire to secure by Letters Patent, is—

In the handles F, for the purpose of turning the table and to which a table cloth may be buttoned substantially as described.

GEO. W. HAGEY.

Witnesses:
JAMES W. CADE,
JOHN W. WEBB.